United States Patent [19]

Yanagisawa et al.

[11] Patent Number: 4,495,912
[45] Date of Patent: Jan. 29, 1985

[54] CONSTANT SPEED RUNNING DEVICE FOR AUTOMOBILE

[76] Inventors: Saburo Yanagisawa, No. 3-8-17, Tsukushino, Machida-shi, Tokyo; Yoshinori Yonemori, No. 5-1-11, Higashigotandan, Shinogawa-ku, Tokyo, both of Japan

[21] Appl. No.: 520,570

[22] Filed: Aug. 5, 1983

[30] Foreign Application Priority Data

Aug. 5, 1982 [JP]  Japan .................. 57-136788

[51] Int. Cl.³ ................................. F02D 5/00
[52] U.S. Cl. ..................... 123/350; 123/361
[58] Field of Search ............ 123/349, 350, 360, 361, 123/395, 398, 399

[56] References Cited

U.S. PATENT DOCUMENTS

| 2,822,882 | 2/1958 | Campbell | 123/350 |
| 3,353,619 | 11/1967 | Lambert | 123/361 |
| 3,392,799 | 7/1968 | Ishikawa | 123/361 |
| 4,161,994 | 7/1979 | Collonia | 123/361 |
| 4,304,202 | 12/1981 | Schofield | 123/350 |
| 4,367,805 | 1/1983 | Totani et al. | 123/361 |

FOREIGN PATENT DOCUMENTS

| 7294 | 2/1982 | Japan . | |
| 110744 | 7/1982 | Japan | 123/350 |

Primary Examiner—Parshotam S. Lall
Attorney, Agent, or Firm—Armstrong, Nikaido, Marmelstein & Kubovcik

[57] ABSTRACT

An automobile constant speed running device wherein a member influencing fuel/air/mixture gas is controlled with a simple mechanical device to control the speed of the automobile to be at a desired set speed. The device includes a wire connected to the member influencing the fuel/air/mixture, a wire winding drum, a gear integral with this drum, a worm meshed with this gear and a shaft movable laterally to place this worm to be disengaged and engaged with the gear so as to be controllable.

2 Claims, 4 Drawing Figures

CONSTANT SPEED RUNNING DEVICE FOR AUTOMOBILE

BACKGROUND OF THE INVENTION

This invention relates to an automobile constant speed running device which controls a member which influences the fuel/air/mixture gas as, for example, the throttle valve or the fuel injection pump to control the speed of the automobile at a desired set speed.

Various kinds of constant speed running devices (popularly known as "cruise control") are already suggested to improve the comfort of driving cars. For example, an automobile speed adjusting device is mentioned in the gazette of Japanese Patent Publication No. 13731/1982, and has an electric adjustor generating a control signal varying depending on an adjustment difference and an adjusting device to which the control signal is added. The adjusting device has an adjusting member operating a member influencing the fuel/air/-mixture gas so that each position of the above-mentioned adjusting member may be detected with a resistance oscillator having a movable part and fixed part and may be transmitted to the adjusting device. The fixed part of the resistance oscillator is fitted so as to resiliently move by a predetermined amount in the moving direction of the movable part and a stopper limiting the displacement of the above-mentioned fixed part is provided on each side of the fixed part so that, in case the movable part moves, the fixed part may be moved together with the above-mentioned movable part in a limited range. Further, a different constant speed running device is mentioned in the gazette of Japanese Patent Publication No. 7294/1982 and is formed of a comparator generating a speed difference signal when a speed difference is generated between a car speed signal corresponding to a car speed and a set car speed signal corresponding to a desired set speed. An actuator adjusts the opening of the throttle valve to increase or decrease the car speed in the direction of eliminating the speed difference signal. The above-mentioned speed difference signal may be fed back to the above-mentioned comparator input through a resistance-capacitance combined delay circuit.

Thus, in the automobile constant speed running device of the convention technique, the member influencing the fuel/air/mixture gas is controlled with a complicated electronic controlling system operated by using an electric signal. Therefore, the formation of the device itself is complicated, the assembling steps for the automobile are many and the producing and assembling costs are high.

BRIEF SUMMARY OF THE INVENTION

An object of the present invention is to provide a constant speed running device for an automobile wherein a running speed adjusting member influencing the fuel/air/mixture gas can be adjusted and controlled with a simple mechanism without using a complicated electronic controlling system as in the above-mentioned conventional technique.

Another object of the present invention is to provide a constant speed running device wherein the component parts and assembling steps are few, the production and assembly are economical and cheap, the formation is compact and the setting space is small.

A further object of the present invention is to provide a constant speed running device which can be easily fitted not only to an automobile being assembled but also to a completed car.

Another object of the present invention is to provide an automobile constant speed running device which can be set irrespective of the speed range of the constant speed running.

Other features and advantages of the present invention will become apparent enough with the follow explanation.

BRIEF DESCRIPTION OF THE DRAWINGS

FIG. 1 is a plan view of a casing as sectioned;

FIG. 2 is a sectioned view on line II—II of FIG. 1;

FIG. 3 is a sectioned view on line III—III of FIG. 1; and

DETAILED DESCRIPTION OF THE PREFERRED EMBODIMENT

Figure 1:
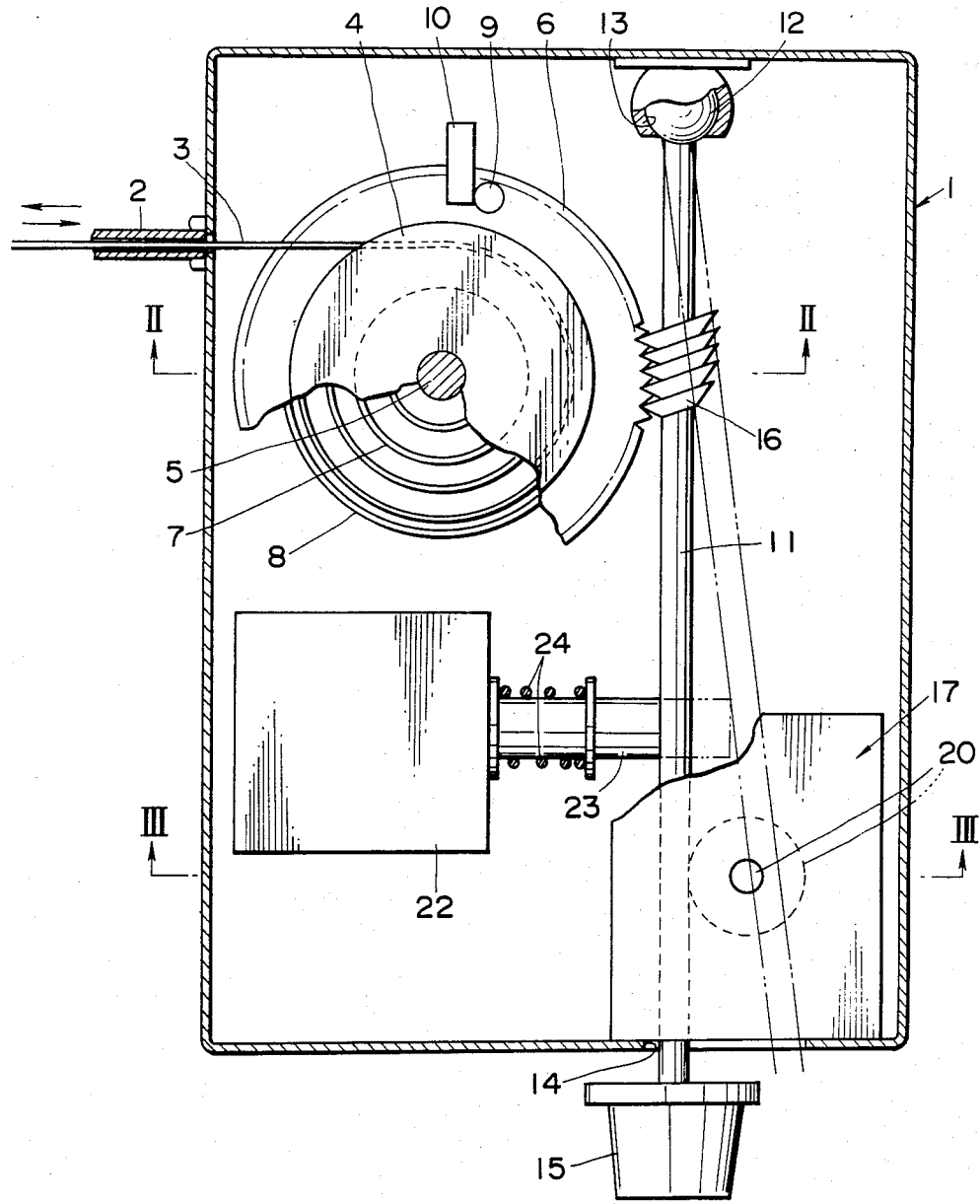
FIGS. 1 to 3 show an embodiment of the constant speed running device of this invention.
Figure 2:
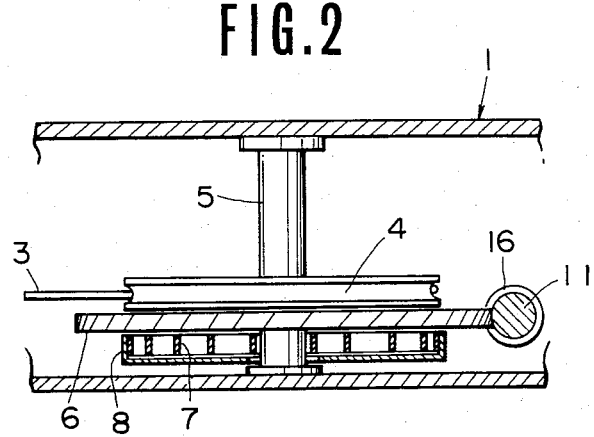
Figure 3:
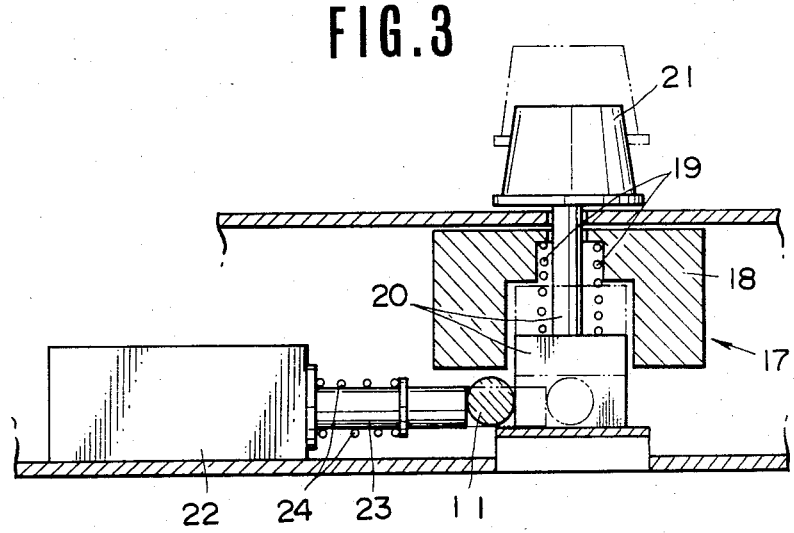

A wire cable cover or housing 2 is fixed at one end on one side surface of a casing 1. A wire 3 pulled and relaxed by the operation of a member influencing the fuel/air/mixture gas as, for example, a throttle valve or fuel injection pump and operating the member influencing the fuel/air/mixture gas by being pulled and relaxed is inserted through the wire cover 2 and is extended into the casing 1 through the end of the wire cover 2. A wire drum 4 winding up the extended wire 3 is arranged within the casing 1 and is pivoted to a shaft 5 rotatably borne on the upper and lower wall surfaces of the casing 1. A gear 6 rotating integrally with the wire drum 4 is pivoted to the shaft 5 below the wire drum 4. A spring 7 is arranged below this gear 6 and is fixed at its inner end to the shaft 5 and at its outer end to a spring cover 8 so as to energize the wire drum 4 and gear 6 in the rotating direction of winding up the relaxed wire 3. Therefore, the energizing force of the spring 7 is set to be weaker than the energizing force of a spring returning the member influencing the fuel/air/mixture gas.

Stoppers 9 and 10 engaging with each other are provided respectively on the gear 6 and casing 1 so that the gear 6 and wire drum 4 may rotate only in a range of substantially one rotation. The wire 3 is wound and unwound in this range of substantially one rotation so as to correspond to the entire operating range of the member influencing the fuel/air/mixture gas. In this embodiment, the rotating range of the gear 6 and wire drum 4 is regulated with the stoppers 9 and 10, because, in fixing the wire 3 at the tip to the member system influencing the fuel/air/mixture gas, if there is no regulating member, the wire 3 will be wound up on the wire drum 4 and will be pulled at its tip into the wire cover 2.

Further, within the casing 1, a shaft 11 is arranged substantially horizontally with respect to the gear 6, and is provided at one end with a spherical journal 12 so as to be free to rotate and incline as borne on the spherical journal 12 within a spherical bearing 13 fitted to the inner side wall of the casing 1. The shaft 11 extends at its other end out of a slot 14 formed in the casing 1 in the far-near direction of the gear 6. An operating grip 15 is fitted to the projecting end of shaft 11 and is movable with the shaft along the slot 14 of the casing 1 utilizing the spherical bearing 13 as a fulcrum from a position where the shaft is near gear 6 to a position away from gear 6. Further, the shaft 11 is provided with a worm 16 opposed to the gear 6 so that, in the position where the shaft 11 approaches the gear 6, that is, when set, the worm 16 engages the gear 6 and, in the position where the shaft is away from the gear 6, that is, when reset, the worm 16 is disengaged from the gear 6.

A solenoid 17 is arranged in the casing 1 at a location away from the spherical bearing 13 and above the shaft 11. The solenoid 17 is formed of a solenoid coil 18, a plunger 20 and a spring 19. The plunger 20 is urged by the resiliency of the contained spring 19 to extend downwardly. The plumber 20 is urged to retract and be held upwardly by the attraction of the coil 18 when excited.

When the solenoid coil 18 is energized and the shaft 11 is separated from the gear 6 so as to be reset, the plunger 20 will retract into the solenoid coil 18 against the resiliency of the contained spring 19. The lower end of the plunger 20 contacts the shaft 11 on its outer, upper periphery. In contrast thereto, when the coil 18 is not energized and the shaft 11 is moved for the worm 16 to engage the gear 6 so as to be set, the plunger 20 no longer contacts the shaft 11 on its outer, upper periphery. The plunger 20 then extends out of the solenoid coil 18 by the urging of the contained spring 19 and contacts a stopper surface formed on the bottom surface of the casing 1. The worm 16 of the shaft 11 is pressed into contact and mesh with the gear 6. The plunger 20 presses against the outer, side periphery of the shaft 11 on the side away from the gear 6 and the bearing part of the shaft 11. The worm 16 located substantially intermediately between the plunger 20 and the bearing part 12 can be pressed into contact and mesh with the gear 6 with a strong force by the principle of a lever. As a result, the gear 6 and wire drum 4 will be locked so as not to be rotatable by the pulling force of the wire 3 or the energizing force of the spring to return the member influencing the fuel/air/mixture gas. However, when the operating grip 15 at the projecting end of the shaft is manually rotated, the gear 6 and wire drum 4 will be rotated through the worm 16 so that the wire 3 may be wound up or unwound and pulled or relaxed. In this manner, the position of the member influencing the fuel/air/mixture gas may be varied and the car speed may be adjusted manually.

The solenoid 17 has a portion of the plunger 20 projecting at its upper end out of the upper surface of the casing 1. A resetting grip 21 is fitted to this projecting end. When the resetting grip 21 is moved up, the plunger 20 will be retracted against the resiliency of the contained spring 19 without any excitation of the solenoid coil 18. The setting pressing the shaft 11 to the gear side will be able to be reset.

Further, within the casing 1, a switching mechanism 22 is arranged between the worm 16 and solenoid 17. A rod 23 reciprocatable in the direction of lateral movement of the shaft 11 projects out of the switching mechanism 22. The rod 23 is urged in the direction of normally separating the shaft 11 from the gear 6 by a spring 24 wound thereon. Therefore, when the plunger 20 is retracted by the excitation of the solenoid coil 18 or manually, the shaft 11 will be pressed toward the side opposite the gear and will be positioned at the lower end of the plunger 20 so as to be reset. The switching mechanism 22 is set to be off when the rod 23 is urged outwardly or is reset by the resiliency of the spring 24. The switching mechanism 22 is set to be off when the rod 23 is retracted or is set by being pressed inwardly by the shaft 11 or the plunger 20. The switching mechanism 22 is electrically connected on its input side with a brake switching system or and clutch switching system so as to pass electricity only when these switching systems are on and at its output side with the solenoid 17.

The operation of the embodiment of the present invention of the above described formation shall be explained in the following.

First of all, when the shaft 11 and worm 16 are separated from the gear 6 so as to be reset, the member influencing the fuel/air/mixture gas will operate in response to movement of the accelerator pedal. The wire 3 will be relaxed or pulled in response to this operation and the wire drum 4 will be freely rotated clockwise or counterclockwise to wind up or unwind the wire 3. When the accelerator pedal is pressed down, the member influencing the fuel/air/mixture gas is moved and a desired car speed is obtained, in order to run at a constant speed maintaining this speed, the operating grip 15 projecting on the side surface of the casing 1 is slid to the gear 6 side along the slot 14. The plunger 20 of the solenoid 17 previously in contact with the shaft 11 on its outer upper periphery of the upper surface extends by the resiliency of the contained spring 19. The plunger 20 then contacts the outer side periphery of the shaft 11 on the side opposite the gear and presses the shaft 11 to the gear 6 side so as to press the worm 16 into contact and mesh with the gear 6. When thus set, the gear 6 and wire drum 4 will be locked so as not to be rotatable by pulling of the wire by the energizing force of the spring returning the member influencing the fuel/air/mixture gas. Thus, constant speed running will be possible. Also, in order to maintain the car speed on an upgrade or downgrade, if the speed is to be increased or decreased, the operating grip 15 is rotated to rotate the gear 6 and wire drum 4 through the shaft 11 and worm 16 which pulls or relaxes the wire 3. The member influencing the fuel/air/mixture gas is so manually operated. On the other hand, when set as mentioned above, if the accelerator pedal is further pressed down, the member influencing the fuel/air/mixture gas will also operate to increase the speed in response to it but the wire 3 relaxed by this operation will remain relaxed. If the pressing of the accelerator pedal is discontinued, the member will return to the set operating position to continue the constant speed running.

On the other hand, when set as mentioned above, the rod 23 of the switching mechanism 22 is pressed by the shaft 11 retracted into the switching mechanism 22. The switch will be on. In this state, if the brake pedal or/and clutch pedal are stepped on, the brake switch and clutch switch will be on, electricity will pass to the solenoid through the switch mechanism 22. The solenoid coil 18 will be excited to retract the plunger 20 against the resiliency of the spring 19. When the plunger 20 retracts, the pressing of the shaft 11 toward the gear 6 will be released and the rod 23 of the switching mechanism 22 will extend by the resiliency of the wound spring 24. The shaft 11 will be pushed to the side opposite the gear and will be slid to the side opposite the gear along the slot 14 of the casing to release the worm 16 from the gear 6. In this state, the lower end of the plunger 20 will contact with the shaft 11 on its outer, upper periphery. The rod 23 will be extended and the switching mechanism 22 will be off. Therefore, even if the brake switch or the like is on, it will be interrupted by the switching mechanism 22 and the solenoid coil 18 will not be excited.

When set, in order to release it, even if the above-mentioned solenoid coil 18 is not excited, the resetting grip 21 of the solenoid 17 can be moved up manually, thereby retracting the plunger 20.

Figure 4:
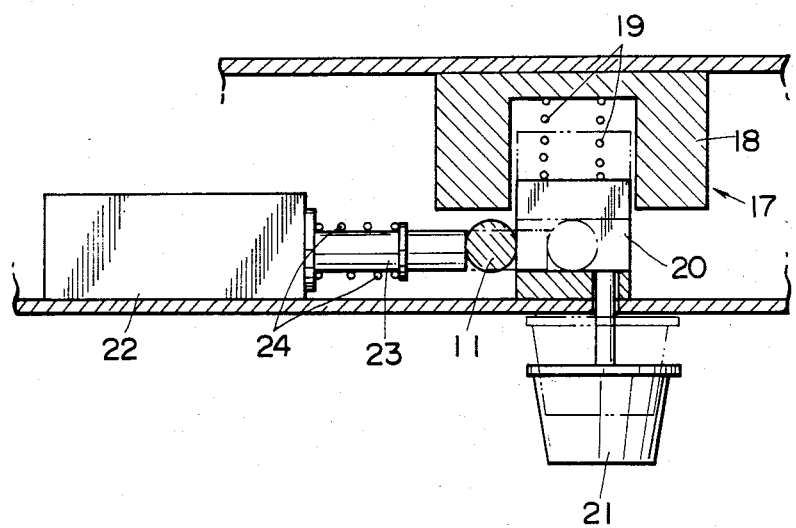
FIG. 4 is a sectioned view showing a modification of a resetting grip of a solenoid in the invention.

FIG. 4 shows a modification of the resetting grip of the solenoid in this invention. In this modification, the rod of the plunger 20 projects in the direction reverse to that of the above-mentioned embodiment. The resetting grip 21 is arranged on the surface side of the casing 1 reverse to that of the above-mentioned embodiment.

It is apparent that, in this invention, working modes differing in a wide range can be formed on the basis of this invention without deviating from the spirit and scope of the invention. This invention is not restricted by its specific working mode except being limited by the appended claims.

What is claimed is:

1. A constant speed running device for an automobile which has an engine with a movable member which influences a fuel/air/mixture, and a wire attached to said member operating and adjusting said member by being pulled and relaxed, said device comprising:

a casing, a drum rotatably mounted in said casing and having an axis, said wire being partially wound on said drum and extending out of said casing to said member, a gear coaxially fixed to said drum, a spring biasing said drum and said gear to rotate in a direction to wind said wire onto said drum when said wire is relaxed, a shaft having opposite ends and axis, one of said ends of said shaft being mounted in said casing for rotational and pivotal movement, said axis of said shaft being perpendicular to said axis of said drum, a worm gear on said shaft, said shaft being laterally pivotable to and from a first set position with said worm engaging said gear and a second reset position with said worm disengaged from said gear, and means for alternatively holding said shaft in said first set position or in said reset second position, said set-reset holding means comprising a solenoid mounted in said casing, said solenoid including a coil, movable plunger mounted co-axially in said coil, and a spring urging said plunger in a direction opposite to the direction of urging by said coil when energized, said plunger having an end surface and a side surface; said solenoid being positioned in said casing so that when said coil is not energized and said shaft is in said second reset position, said end surface of said plunger contacts the outer periphery of the other end portion of said shaft and is urged thereagainst by said spring, and when said shaft is moved from said second reset position to said first set position, the contact by the end surface is broken, said plunger moves by force of said spring and said side surface of said plunger contacts the outer periphery of said other end of said shaft on a side opposite to said gear thereby holding said shaft in said first set position, the contact of the side surface and the outer periphery being broken when said coil is energized moving said plunger against the urging of the spring to release said shaft from said first set position.

2. A constant speed running device for an automobile which has an engine with a movable member which influences a fuel/air/mixture, and a wire attached to said member operating and adjusting said member by being pulled and relaxed, said device comprising:

a casing, a drum rotatably mounted in said casing and having an axis, said wire being partially wound on said drum and extending out of said casing to said member, a gear coaxially fixed to said drum, a spring biasing said drum and said gear to rotate in a direction to wind said wire onto said drum when said wire is relaxed, a shaft having opposite ends and axis, one of said ends of said shaft being mounted in said casing for rotational and pivotal movement, said axis of said shaft being perpendicular to said axis of said drum, a worm gear on said shaft, said shaft being laterally pivotable to and from a first set position with said worm engaging said gear and a second reset position with said worm disengaged from said gear, means for alternatively holding said shaft in said first set position or in said second reset position, and means for releasing said means for holding said shaft from said first set position and for moving said shaft from said first set position said second reset position, said set-reset holding means comprising a solenoid mounted in said casing, said solenoid including a coil, a movable plunger mounted coaxially in said coil, and a spring urging said plunger in a direction opposite to the direction of urging by said coil when energized, said plunger having an end surface and a side surface; said solenoid being positioned in said casing so that when said coil is not energized and said shaft is in said second reset position, said end surface of said plunger contacts the outer periphery of the other end portion of said shaft and is urged thereagainst by said spring, and when said shaft is moved from said second reset position to said first set position, the contact by the end surface is broken, said plunger moves by force of said spring and said side surface of said plunger contacts the outer periphery of said other end of said shaft on a side opposite to said gear thereby holding said shaft in said first set position, the contact of the side surface and the outer periphery being broken when said coil is energized moving said plunger against the urging of the spring to release said shaft from said first set position, said means for releasing and for moving comprising, a switch mechanism including a rod reciprocatingly mounted in said casing on a side of said other end of said shaft from said plunger, means biasing said rod to push against said other end to move said shaft from said first set position to said second reset position, and switch means operatively coupled to said rod, said rod being movable to and from a first position where said shaft is in said first set position and a second position where said shaft is in said second reset position, said switch means being capable of passing current when said rod is in said first position and being incapable of passing current when said rod is in said second position, and a clutch and/or brake switch system electrically connected to said solenoid.

* * * * *